(12) United States Patent
Marshall et al.

(10) Patent No.: US 9,542,774 B2
(45) Date of Patent: *Jan. 10, 2017

(54) DETERMINING A NODE PATH THROUGH A NODE GRAPH

(75) Inventors: Carl S. Marshall, Portland, OR (US); Adam T. Lake, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 13/368,675

(22) Filed: Feb. 8, 2012

(65) Prior Publication Data

US 2012/0139921 A1 Jun. 7, 2012

Related U.S. Application Data

(63) Continuation of application No. 12/482,209, filed on Jun. 10, 2009, now Pat. No. 8,135,566, which is a continuation of application No. 10/039,425, filed on Jan. 4, 2002, now Pat. No. 7,548,241.

(51) Int. Cl.
*G06T 17/00* (2006.01)
*G06T 17/20* (2006.01)

(52) U.S. Cl.
CPC .................................. *G06T 17/20* (2013.01)

(58) Field of Classification Search
CPC .................................................... G06T 17/20
USPC ....... 345/428, 473, 475, 581, 583, 949, 959; 700/2; 703/1, 2, 6, 7
See application file for complete search history.

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A | 8/1989 | Robinson |
| 4,901,064 A | 2/1990 | Deering |
| 4,905,233 A | 2/1990 | Cain et al. |
| 5,124,914 A | 6/1992 | Grangeat |
| 5,163,126 A | 11/1992 | Einkauf et al. |
| 5,371,778 A | 12/1994 | Yanof et al. |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara et al. |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,872,773 A | 2/1999 | Katzela et al. |

(Continued)

OTHER PUBLICATIONS

Zorin, et al., "Interpolating Subdivision for Meshes of Arbitrary Topology", Tech. Rep. CS/TR/96/06, Caltech, Department of Computer Science, 1996.

(Continued)

*Primary Examiner* — Carlos Ortiz Rodriguez
(74) *Attorney, Agent, or Firm* — Lynch Law Patent Group, P.C.

(57) ABSTRACT

Determining a node path through a node graph includes modifying the node graph in accordance with a predetermined platform performance, performing a path finding process through the node graph to obtain the node path, determining if the platform performance has changed, adjusting the node graph to compensate for a change in the platform performance, and re-performing the path finding process through the adjusted node graph to obtain the node path.

20 Claims, 7 Drawing Sheets

(56) References Cited

U.S. PATENT DOCUMENTS

| | | | |
|---|---|---|---|
| 5,881,243 | A | 3/1999 | Zaumen et al. |
| 5,894,308 | A | 4/1999 | Isaacs |
| 5,929,860 | A | 7/1999 | Hoppe |
| 5,933,148 | A | 8/1999 | Oka et al. |
| 5,949,969 | A | 9/1999 | Suzuoki et al. |
| 5,966,133 | A | 10/1999 | Hoppe |
| 5,966,134 | A | 10/1999 | Arias |
| 5,974,423 | A | 10/1999 | Margolin |
| 5,999,189 | A | 12/1999 | Kajiya et al. |
| 6,054,999 | A | 4/2000 | Strandberg |
| 6,057,859 | A | 5/2000 | Handelman et al. |
| 6,078,331 | A | 6/2000 | Pulli et al. |
| 6,098,107 | A | 8/2000 | Narvaez-Guarnieri et al. |
| 6,115,050 | A | 9/2000 | Landau et al. |
| 6,175,655 | B1 | 1/2001 | George, III et al. |
| 6,191,787 | B1 | 2/2001 | Lu et al. |
| 6,191,796 | B1 | 2/2001 | Tarr |
| 6,198,486 | B1 | 3/2001 | Junkins et al. |
| 6,201,549 | B1 | 3/2001 | Bronskill |
| 6,208,347 | B1 | 3/2001 | Migdal et al. |
| 6,219,070 | B1 | 4/2001 | Baker et al. |
| 6,239,808 | B1 | 5/2001 | Kirk et al. |
| 6,252,608 | B1 | 6/2001 | Snyder et al. |
| 6,262,737 | B1 | 7/2001 | Li et al. |
| 6,262,739 | B1 | 7/2001 | Migdal et al. |
| 6,292,192 | B1 | 9/2001 | Moreton |
| 6,292,194 | B1 | 9/2001 | Powell, III |
| 6,317,125 | B1 | 11/2001 | Persson |
| 6,337,880 | B1 | 1/2002 | Cornog et al. |
| 6,388,670 | B2 | 5/2002 | Naka et al. |
| 6,401,038 | B2 | 6/2002 | Gia |
| 6,405,071 | B1 | 6/2002 | Analoui |
| 6,421,051 | B1 | 7/2002 | Kato |
| 6,437,782 | B1 | 8/2002 | Pieragostini et al. |
| 6,478,680 | B1 | 11/2002 | Yoshioka et al. |
| 6,559,848 | B2 | 5/2003 | O'Rourke |
| 6,573,890 | B1 | 6/2003 | Lengyel |
| 6,593,924 | B1 | 7/2003 | Lake et al. |
| 6,593,927 | B2 | 7/2003 | Horowitz et al. |
| 6,608,627 | B1 | 8/2003 | Marshall et al. |
| 6,608,628 | B1 | 8/2003 | Ross et al. |
| 6,970,171 | B2 | 11/2005 | Baraff et al. |
| 7,050,904 | B2 | 5/2006 | Powell et al. |
| 8,135,566 | B2 | 3/2012 | Marshall et al. |
| 2001/0026278 | A1 | 10/2001 | Arai et al. |
| 2002/0101421 | A1 | 8/2002 | Pallister |

OTHER PUBLICATIONS

Hoppe, "Progressive Simplicial Complexes", Microsoft Research, 1997 URL: http://www.research.microsft.com/~hoppe/.
Thomas (Contributor) et al., "The Illusion of Life: Disney Animation", 1995, pp. 47/51.
"pmG Introduces Messiah: Animate 3.0", URL: http://www.digitalproducer.com/aHTM/Articles/july_2000/july_17_OO/pmg_intros_messiah_animate.htm, (Accessed Oct. 26, 2004), 2 pages.
Advogato's Trust Metric, www.advogato.org, 2000.
Alliez, et al., "Progressive Compression for Lossless Transmission of Triangle Meshes", University of Southern California, Los Angeles, CA, Aug. 2001, pp. 195/202.
Appel, "The Notion of Quantitative Invisibility and the Machine Rendering of Solids", Proceedings of 22nd National Conference Association for Computing Machinery, 1967.
Bajaj, et al., "Progressive Compression and Transmission of Arbitrary Triangular Meshes", Department of Computer Sciences, University of Texas at Austin Austin TX, 1999, pp. 307/316.
Bandi, et al., "Path finding for human motion in virtual environments", Elsevier Science, 2000.
Bandi, et al., "Space discretization for efficient human navigation", Swiss Federal Institute of Technology, (1998).
Bandi, et al., "The use of space discretization for autonomous virtual humans", Swiss Federal Institute of Technology, 1998.
Brockington, "Pawn Captures Wyvern: How Computer Chess Can Improve Your Pathfinding", Gama Network, 2000.
He, "Real-time Visualization of Dynamic Terrain for Ground Vehicle Simulation", PhD. Thesis, University of Iowa, 2000.
Buck, et al., "Performance/Driven Hand/Drawn Animation", ACM (NPAR2000), 2000, pp. 101/108.
Catmull, et al., "Recursively Generated B/Spline Surfaces on Arbitrary Topological Meshes", Computer Aided Geometric Design, 1978, vol. 10, Issue No. 6, 1978, pp. 350/355.
Chow, "Optimized Geometry Compression for Real/time Rendering", Massachusetts Institute of Technology, Proceedings Visualization, Oct. 1997, pp. 347/354.
Coelho, et al., "An Algorithm for Intersecting and Trimming Parametric Meshes", ACM SIGGRAPH, 1998, pp. 1/8.
Cohen/Or, et al., "Progressive Compression of Arbitrary Triangular Meshes", Computer Science Department, School of Mathematical Sciences, Tel Aviv, Israel, Oct. 1999.
Deering, "Geometry Compression", Computer Graphics. SIGGRAPH '95, 1995, pp. 13/20.
Derose, et al., "Subdivisional Surfaces in Character Animation", ACM, SIGGRAPH'98, 1998, pp. 85 /94.
Dyn, N, et al., "A Butterfly Subdivision Scheme for Surface Interpolation with Tension Control", ACM Transactions on Graphics, 1990, vol. 9, Issue No. 2.
Egbert, et al., "Collision/Free Object Movement Using Vector Fields", Brigham Young University, 1996.
Elber, "Line Art Rendering via a Coverage of Isoperimetric Curves", IEEE Transactions on Visualization and Computer Graphics, Department of Computer Science, Technion, Israel Institute of Technology, Haifa, Israel, vol. 1, Sep. 1995.
Elber, "Interactive Line Art Rendering of Freeform Surfaces", Eurographics'99, vol. 18, Issue No. 3, C1/C12, 1999.
Foley, et al., "Computer graphics: principal and practice", Addison/Wesley Publishing Company Reading, MA, 1996, pp. 1060/1064.
Frohlich, et al., "Autonomous and Robust Navigation for Simulated Humanoid Characters in Virtual Environments", IEEE, 2002.
Garcia, "A Path/Finding Algorithm for Loop/Free Routing", IEEE, 1997.
Garland, et al., "Surface simplification using quadratic error metrics", IEEE, 1997.
Gooch, et al., "A Non/Photorealistic Lighting Model for Automatic Technical Illustration", Computer Graphics Proceedings, Annual Conference Series, SIGGRAPH'98, 1998, pp. 447/452.
Gooch, et al., "Interactive Technical Illustration", ACM Interactive 3D, 1999, pp. 31 /38.
Heidrich, et al., "Realistic, Hardware/Accelerated Shading and Lighting", ACM, SIGGRAPH'99, 1999, pp. 171/178.
Hoppe, "Efficient Implementation of progressive meshes", Coput. & Graphics, 1998,vol. 22, Issue No. 1, pp. 27/36.
Hoppe, "Progressive Meshes", Microsoft Research, 1996, pp. 99/108 URL: http://www.research.microsoft.com/research/graphics/hoppe/.
Hoppe, "View/Dependent Refinement of Progressive Meshes", Microsoft Research, 1997 URL: http://research.microsoft.com/~hoppe/.
Hoppe, "Smooth View/Dependent Level/of/Detail Control and its Application to Terrain Rendering", IEEE Visualization, 1998.
Hoppe, "Research Interests", 2008 URL: http://research.microsoft.com/hoppe/#pm.
Kumar, et al., "Interactive Display of Large Scale NURBS Models", ACM, Symp. On Interactive 3D Graphics, 1995, pp. 51/58.
Lake, et al., "Stylized Rendering Techniques for Scalable Real/Time 3D Animation", 2000.
Lander, "Making Kine More Flexible", Game Developer Magazine, Nov. 1998, 5 pages.
Lander, "Skin Them Bones", Game Developer Magazine, May 1998, 4 pages.
Landsdown, et al., "Expressive Rendering: A Review of Nonphotorealistic Techniques", IEEE Computer graphics and Applications, 1995, pp. 29/37.
Lasseter, "Principles of Traditional Animation Applied to 3D Computer Animation", Pixar, San Rafael, California, 1987.

(56) References Cited

OTHER PUBLICATIONS

Lee, "Navigating through Triangle Meshes Implemented as Linear Quadtrees", Computer Science Department, Center for Automation Research, Institute for Advanced Computer Studies, University of Maryland College Park, MD, Apr. 1998.
Leung, et al., "Interactive viewing of3D terrain models using VRML", Syracuse University, 1998.
Lewis, "Pose Space Deformation: A Unified Approach to Shape Interpolation and Skeleton/Driven Deformation", Centropolis, New Orleans, LA, 2000, pp. 165/172.
Lonzano, et al., "An Algorithm for Planning Collision/Free Paths Among Polyhedral Obstacles", ACM, 1979.
Ma, et al., "Extracting Feature Lines for 3D Unstructured Grids", Institute for Computer Applications in Science and Engineering (ICASE), NASA Langley Research Center, Hampton, VA, IEEE, 1997.
Markosian, et al., "Real/Time Nonphotorealistic Rendering", Brown University site of the NSF Science and Technology Center for Computer Graphics and Scientific Visualization, Providence, 1997.
Pajarola, et al., "Compressed Progressive Meshes", Graphics, Visualization & Usability Center, College of Computing, Georgia Institute of Technology, Jan. 1999.
Pedersen, "A Framework for Interactive Texturing on Curved Surfaces", ACM, 1996, pp. 295/301.
Popovic, et al., "Progressive Simplicial Complexes", Microsoft Research, 1997 URL: <http//www.research.microsoft.com/~hoppe/>.
Pueyo, et al., "Rendering Techniques '96", Proc. of Eurographics Rendering Workshop 1996, Eurographics, 1996, pp. 61 /70.
Raskar, et al., "Image Precision Silhouette Edges", University of North Carolina at Chapel Hill, Microsoft Research, 1999 Symposium on Interactive 3D Graphics Atlanta, 1999, pp. 135/231.
Rockwood, et al., "Real/time Rendering of Trimmed Surfaces", Computer Graphics (SIGGRAPH) '89 Proceedings, 1989, pp. 107/116.
Samet, "Applications of spatial data structures: computer graphics, image processing, and GIS", University of Maryland, Addison/Wesley Publishing Company, Reading, Jun. 1990, pp. 1060/1064.
Sousa, et al., "Computer/Generated Graphite Pencil Rendering of 3/D Polygonal Models", Eurographics'99, 1999, pp. C195 / C207.
Stam, "Exact Evaluation of Catmull/Clark Subdivision Surfaces at Arbitrary Parameter Values", SIGGRAPH 98 Conference Proceedings, Annual Conference Series, 1998, pp. 395/404.
Taubin, et al., "3D Geometry Compression", SIGGRAPH'98 Course Notes, 1998.
Taubin, et al., "Progressive Forest Split Compression", IBM TJ. Watson Research Center, Yorktown Heights, 1998.
Thalmann, et al., "Computer Animation in Future Technologies", University of Geneva, 1996.
Thomas, et al., "The Illusion of Life: Disney Animation", Hyperion New York, NY, 1981, pp. 47/71.
To, et al., "A method for Progressive and Selective Transmission of Multi/Resolution Models", AGM, 1999.
Ware, et al., "Layout for Visualizing Large Software Structures in 3D", University of New Brunswick, 2000.
Wilhelms, et al., "Anatomically Based Modeling", Univ. California Santa Cruz 1997 (retrieved Dec. 22, 2004) URL: http://graphics.stanford.edu/courses/cs448/0I/spring/papers/wilhelnis.pdf>.
Zeleznik, et al., "Sketch: An Interface for Sketching 3D Scenes", Brown University site of the NSF Science and Technology Center for Computer Graphics and Scientific Visualization, 1996.

DETERMINING A NODE PATHTHROUGH A NODE GRAPH

RELATED APPLICATION

The present application is a continuation of U.S. patent application Ser. No. 12/482,209, filed on Jun. 10, 2009, entitled "DETERMINING A NODE PATHTHROUGH A NODE GRAPH" which is hereby incorporated herein by reference in its entirety and for all purposes. Further this above mentioned application Ser. No. 12/482,209, is a continuation of U.S. patent application Ser. No. 10/039,425, filed on Jan. 4, 2002, entitled "DETERMINING A NODE PATHTHROUGH A NODE GRAPH" now Patented as U.S. Pat. No. 7,548,241, issued on Jun. 16, 2009.

TECHNICAL FIELD

This invention relates to determining a node path through a node graph relating to a three-dimensional (3D) mesh.

BACKGROUND

A 3D mesh is made up of one or more polygons that define a surface, such as a terrain. The number of polygons in the 3D mesh may be increased, resulting in increased resolution, or decreased, resulting in decreased resolution. Increasing the number of polygons in the 3D mesh increases the resolution of the surface by making the surface more detailed and decreasing the number of polygons in the 3D mesh decreases the resolution of the surface by making the surface less detailed.

Decreasing the resolution of the surface can increase rendering performance, particularly on low-end hardware. That is, since there are fewer polygons to process, the 3D mesh can be manipulated using a less powerful graphics processor and/or using fewer processor cycles. This could also relate to a node graph defined by a 3D mesh.

DESCRIPTION OF DRAWINGS

Like reference numerals in different figures indicate like elements.

DETAILED DESCRIPTION

A 3D mesh may be used to represent a node graph. In this context, a node graph is a collection of nodes that define features of an environment, such as a terrain. The nodes may be positioned in 3D space to define the length, width and height of environmental features. An animated model traverses the node graph by "interpolating" through the nodes, which means that they are moving in between the nodes. Also, the nodes can be control points for a spline which the model uses as a node path. In this regard, a route that the model takes through the node graph is referred to as the node path.

Figure 1:
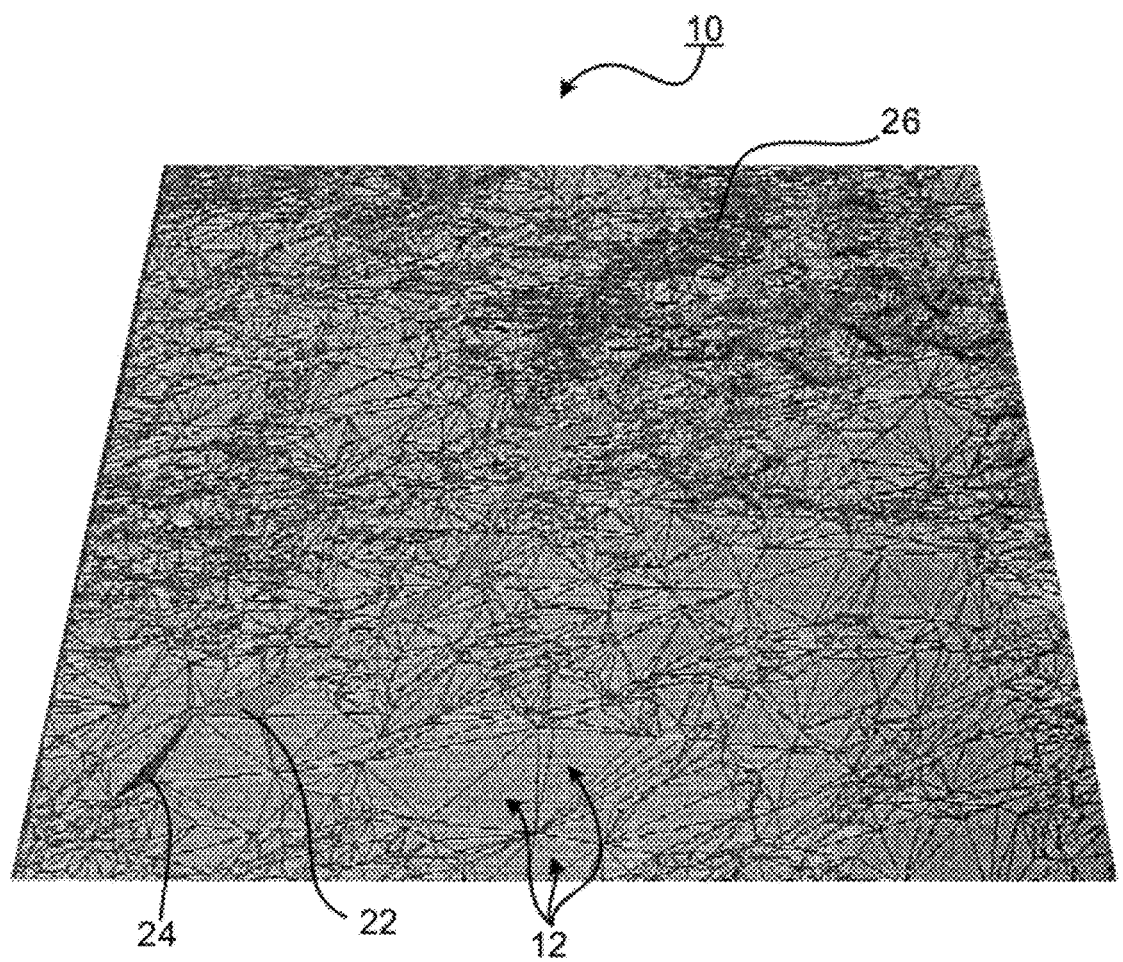
FIG. 1 is view of a 3D mesh.

Referring to FIG. 1, a 3D mesh 10, which may be used to represent a node graph of a terrain, is comprised of interconnecting polygons 12. Polygons 12 are triangles in this embodiment; however, other types of polygons, such as quadrilaterals, may be used instead of triangles.

3D mesh 10 defines a polygonal surface 14 (FIG. 2), here mountainous terrain, that can be traversed by a 3D model, such as a video game character. The polygonal surface and/or a corresponding node graph can be created via a parametric surface. The 3D data for surface 14 defines interconnecting polygons 12 that make up 3D mesh 10. A node graph for surface 14 is defined using polygons 12. That is, polygons in 3D mesh 10 are defined to be nodes within the node graph. Each polygon may be assigned a node or the nodes may be dispersed throughout 3D mesh 10 on non-adjacent polygons.

A node graph may contain one or more blocking nodes. A blocking node defines a point through which a 3D model cannot pass while traversing the node graph (via a node path). Data is associated with each blocking node, which indicates that a 3D model along the node path cannot pass through the blocking node. The 3D model thus must go around the blocking node, rather than through it. Examples of objects defined by blocking nodes can include a tree, a wall, a building, a mountain, or any other non-permeable objects.

Figure 3:
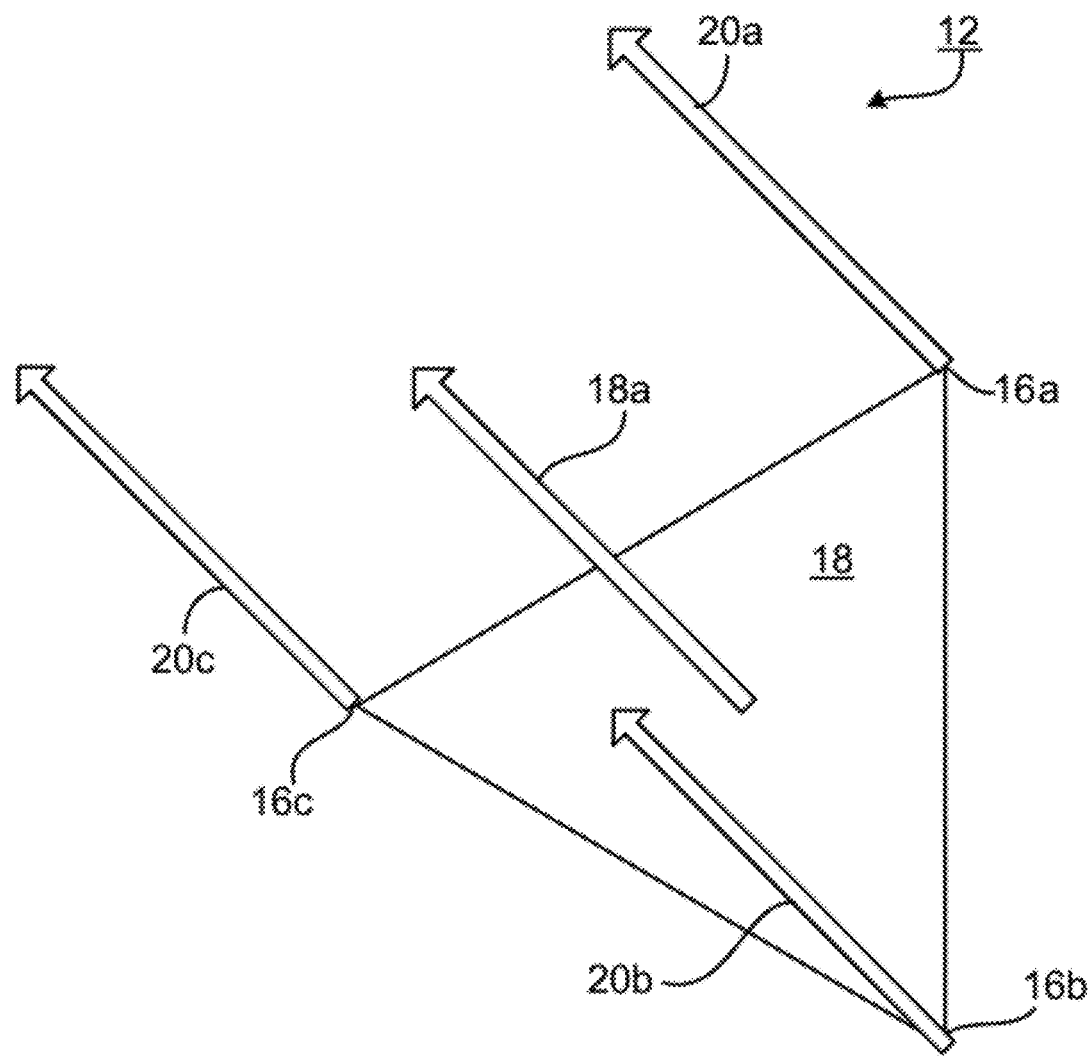
FIG. 3 is a view of a polygon in the 3D mesh.

Referring to FIG. 3, the 3D data for a polygon 12 in 3D mesh 10 defines coordinates for three vertices 16a, 16b and 16c positioned in Cartesian XYZ (or other) 3D space. These vertices define a face 18 for polygon 12. The 3D data also defines a unit normal vector 20a, 20b and 20c to each vertex 16a, 16b and 16c and a unit normal vector 18a to face 18. The unit normal vectors for face 18 and vertices 16a, 16b and 16c have a magnitude of one and are orthogonal (i.e., normal) to face 18. These vectors are used to determine the shading of polygon 12 from a virtual light source.

Figure 2:
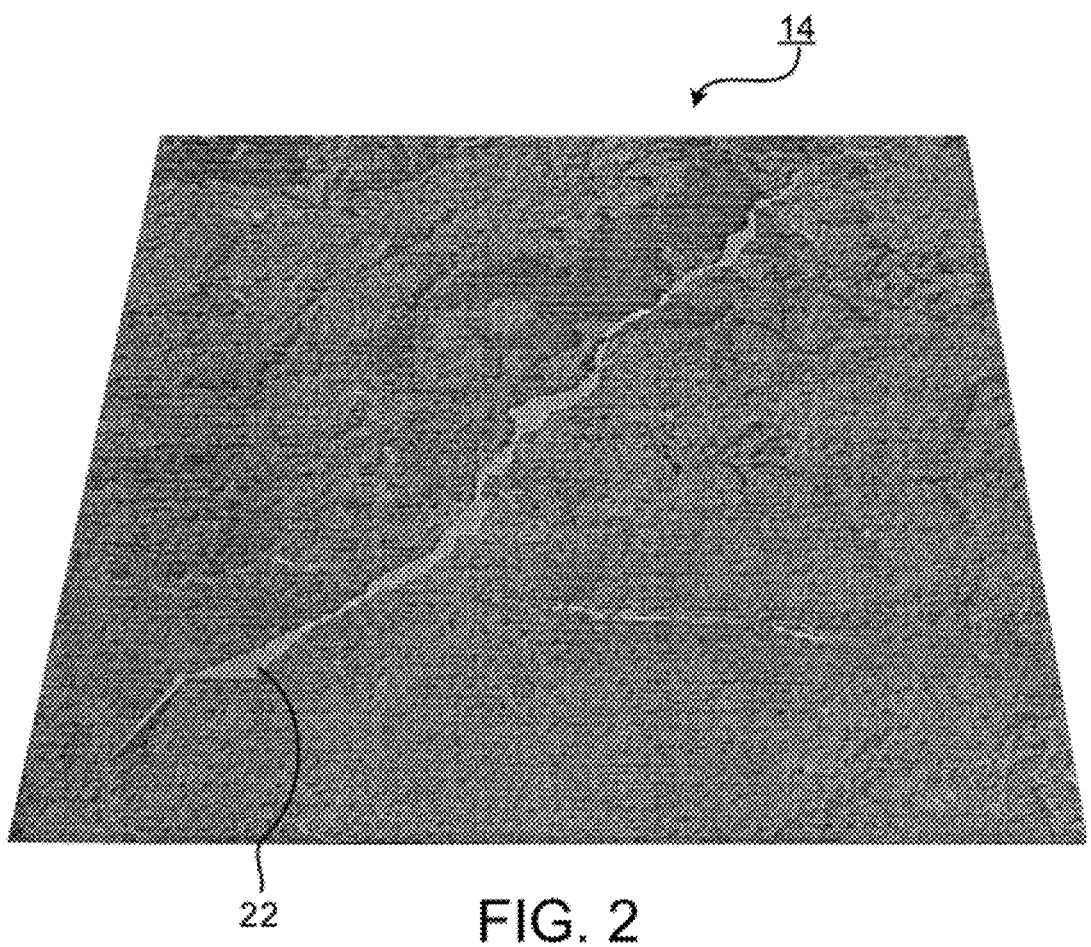
FIG. 2 is a view of a surface terrain represented by the 3D mesh.

Referring to FIGS. 1 and 2, a node path 22 is also defined through 3D mesh 10. As noted, a node path is a route that is defined through a node graph. In the example of FIG. 1, a node path 22 is a trail through surface 14.

Generally, a node path contains a starting node and a destination node. The starting node is the start point of the node path and may be associated with a node (in this case, a polygon of 3D mesh 10) at the beginning of the node path. The start and end of the node path are defined by the intended movement of a 3D model along the node path from an initial position to a destination. In the example shown in FIG. 1, polygon 24 contains the start node.

The destination node is the end point of the node path and may be associated with a node (in this case, a polygon of 3D mesh 10) at the end of the node path. In the example shown in FIG. 1, polygon 26 contains the destination node.

Node path 22 may be defined by the data that makes up the node graph associated with 3D mesh 10. For example, the nodes of the node graph, and thus node path 22, may be located at centers of polygons on the path or at vertices of polygons on the path. Alternatively, the nodes of the node graph may be defined by data that is separate from 3D mesh 10. In this case, the node graph is superimposed over the appropriate portion of 3D mesh 10. Node graphs that are separate from the 3D mesh may contain associations to vertices on the mesh. Therefore, changing the 3D mesh also results in corresponding changes in the node graph (and thus, the node path). Consequently, node graphs that are defined by data that is separate from the 3D mesh can be processed similarly to node graphs that are defined by data associated with the 3D mesh.

Figure 4:
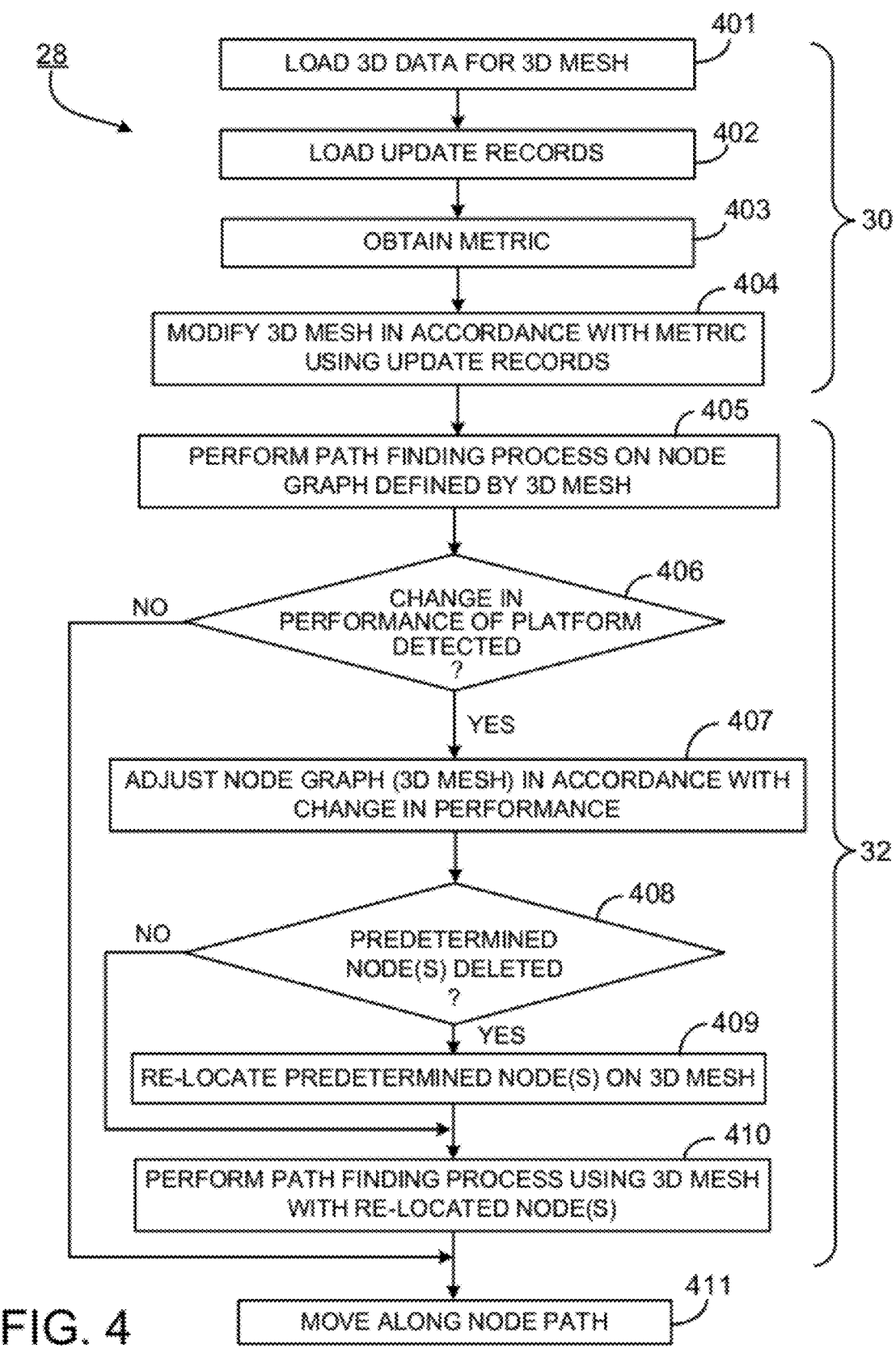
FIG. 4 is a flowchart showing a process for determining a node path through the 3D mesh.

Referring to FIG. 4, a process 28 is shown for determining a node path through a node graph, such as 3D mesh 10. Process 28 however, is not limited to use with a node graph defined by a 3D mesh, but rather can be used with any type of node graph defined by 3D or two-dimensional (2D) data.

In this embodiment, process 28 contains two stages: a pre-processing stage 30 and a run-time stage 32. Pre-processing stage 30 can be performed only once for a 3D animation sequence having multiple frames to be processed. If desired, pre-processing stage 30 can be performed several times randomly or at pre-specified time intervals. Run-time stage 32 is performed for each frame of an animation sequence.

Process 28 will be described with respect to 3D mesh 10 (FIG. 1) and surface 14 (FIG. 2). It is assumed that a node graph, and thus node path 22, through 3D mesh 10/surface 14 is defined by the 3D data that makes up 3D mesh 10.

In pre-processing stage 30, process 28 loads (401) 3D data for an animation sequence that includes 3D mesh 10. In this example, 3D mesh 10 is a single frame of the animation sequence. The 3D data includes the polygon structures shown in FIG. 1, along with data defining the node graph on 3D mesh 10. The 3D data may be loaded from memory into, e.g., a computer processing unit (CPU) that runs process 28.

Process 28 loads (402) update records into the CPU. The update records specify the number and locations of polygons to remove, combine, or divide when adjusting the node graph through 3D mesh 10. As described below, the node graph is adjusted by changing the number of polygons in 3D mesh 10 using the update records.

Process 28 obtains (403) a metric that affects the way that process 28 operates. The metric may be obtained in any manner. For example, the metric may be retrieved from memory, downloaded from a network, or received via a graphical user interface (GUI) (not shown). In this embodiment, the metric relates to the performance of a platform (e.g., a CPU, graphics processor, operating system, or the like) that is running process 28. The metric may specify a frame rate for the animation sequence that contains the node graph, in this case that contains 3D mesh 10. For example, the metric may require the platform to maintain a frame rate of thirty frames-per-second during the animation sequence.

Process 28 modifies (404) 3D mesh 10, and thus the node graph, in accordance with the metric. Process 28 modifies (404) the 3D mesh by changing the number of polygons that make up 3D mesh 10. The number of polygons may be increased or decreased at this point. To increase the number of polygons, a standard subdivision technique may be used. This would be done, e.g., for high-speed processors that are capable of handling large amounts of data. For the sake of illustration, however, it is assumed here that process 28 starts with a highest resolution 3D mesh and, therefore, the number of polygons is reduced, thereby reducing the resolution of the node graph. A reduction in the number of polygons in 3D mesh 10 enables the CPU or graphics processor running process 28 to comply with the metric (minimum frame rate).

Figure 5:
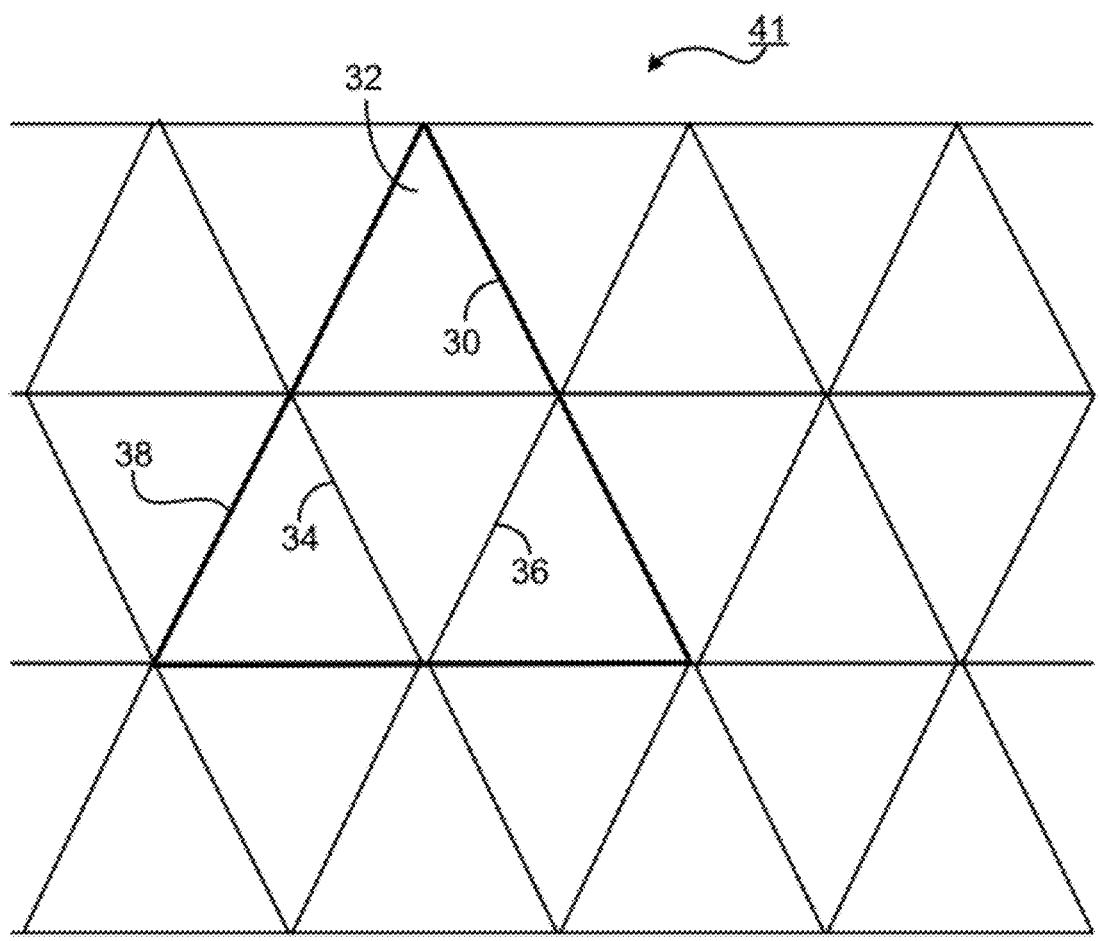
FIG. 5 is a view of several polygons in the 3D mesh.

One technique that may be used to reduce the resolution of 3D mesh 10 is the multi-resolution mesh (MRM) technique. This technique involves removing vertices of polygons defined by the update records, particularly vertices that are interior to a 3D mesh, and then connecting unconnected vertices to form new, larger polygons. By way of example, as shown in FIG. 5, edge 30 of polygon 32 is interior to 3D mesh 41. Consequently, its removal will not have a dramatic effect either way on the resolution of the 3D mesh. Accordingly, edge 30 can be removed, along, e.g., with edges 34 and 36, by removing their respective vertices and combining the smaller polygons and produce a larger polygon 38.

Process 28 performs (405) a path finding process on the node graph defined by modified 3D mesh 10. The path finding process determines the path 22 a 3D model should take through the node graph defined by modified 3D mesh 10 to go from a predetermined starting point to a predetermined destination. Typically, the shortest route is determined; however, this is not a requirement. Examples of standard path finding processes that may be used include the A* process, the Dijkstra process, the depth-first process, and the breadth-first process. Typically, path finding processes begin at a "start" node, examine nodes around the start node, and determine which node has the least cost in terms of distance keeping the destination node in mind. The path finding process then advances to that node and repeats itself until it reaches the destination node.

Process 28 determines (406) if there is a change in the performance of the platform during the animation sequence. A change in the performance of the platform may result from any number of occurrences. For example, other computer programs running at the same time as the animation sequence may drain the platform's resources, resulting in a change in the platform's performance. Generally speaking, a change in performance refers to deterioration in performance; however, an increase in performance may also be detected.

If process 28 detects a change in performance of the platform, process 28 adjusts (407) the node graph by adjusting 3D mesh 10 in accordance with the change in performance, e.g., to compensate for the change in performance. For example, the performance of the platform may deteriorate such that the platform can only run twenty frames-per-second of animation. In this case, process 28 may reduce the number of polygons in the 3D mesh, and thereby adjust the node graph.

Because there are fewer polygons to process, the platform will be able to increase the number of frames that it can process per second. Conversely, if the performance of the platform increases, process 28 may increase the number of polygons in the 3D mesh, thereby providing enhanced resolution for higher-powered machines.

Figure 6:
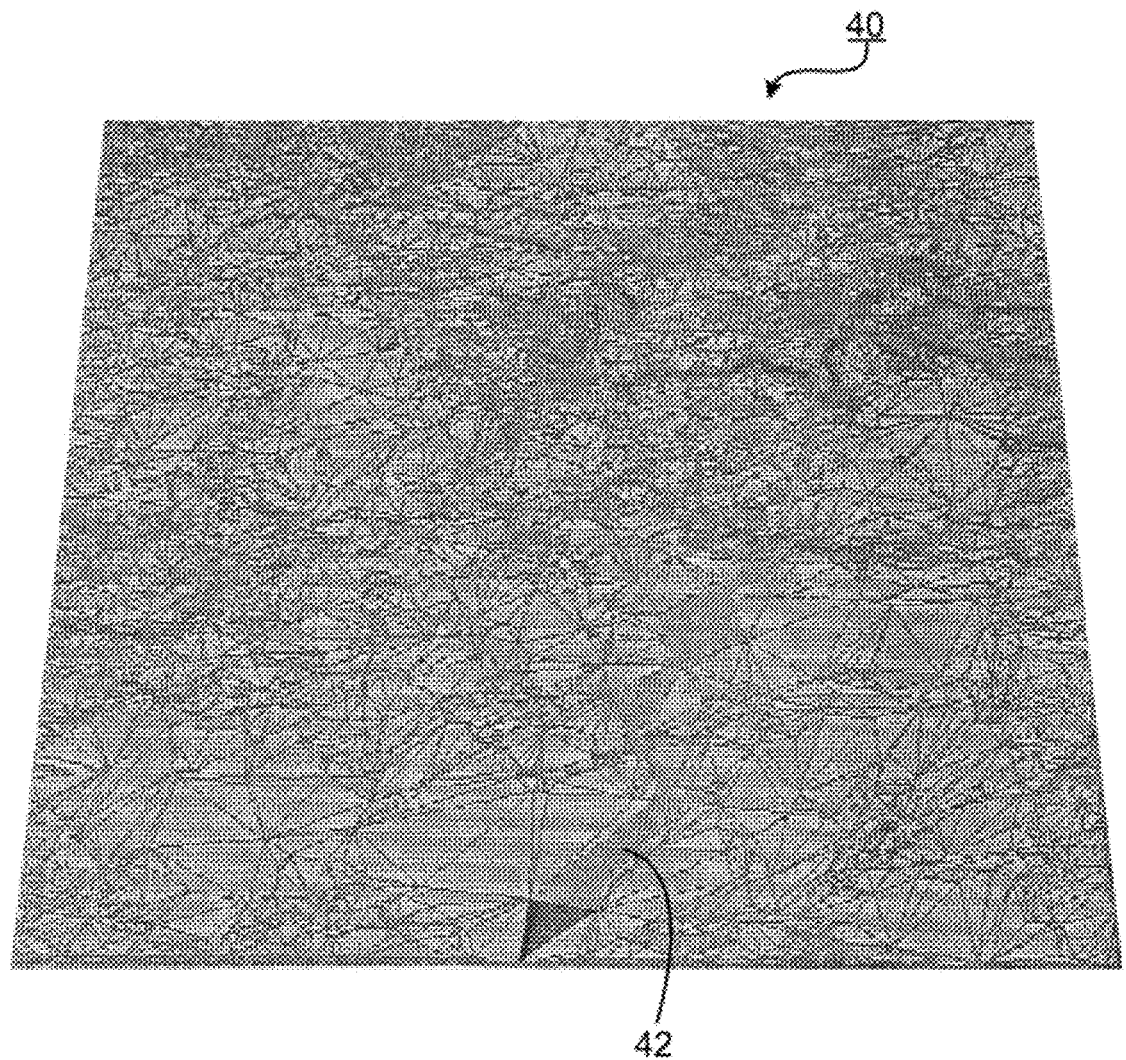
FIG. 6 is a view of a reduced-resolution (fewer polygons) version of the 3D mesh.

In this example, to adjust the node graph, process 28 generates a new, lower-resolution version of 3D mesh 10. An example of a new version of 3D mesh 10 is shown in FIG. 6 and is labeled 40 to avoid confusion with the version shown in FIG. 1. 3D mesh 40 includes an adjusted node graph, and thus an adjusted node path 42. Adjusted node path 42 (FIG. 6) differs from node path 22 (FIG. 1) in that adjusted node path 42 is defined by fewer polygons than node path 22.

Process 28 determines (408) if one or more predetermined types of nodes has been removed by adjusting (407) the node graph. In this context, such nodes include a start node, a destination node, and/or a blocking node. If one (or more) of these nodes has been removed from the 3D mesh, process 28 re-locates (409) the node on the 3D mesh and performs (410) the path finding process on the node graph with the re-located node. What is meant by "re-locate" in this context is to re-define the location of the predetermined node, which may, or may not, mean moving from a current path position.

Process 28 may re-locate (409) the node as follows. Process 28 may obtain a position on the adjusted 3D mesh 40 that corresponds to the node that was deleted, e.g., the original position of the node on 3D mesh 10. Process 28 may assign the node to a polygon in the 3D mesh that is closest to the original position. Process 28 may assign the node to the candidate that is closer to the destination node.

Alternatively, process 28 may re-locate (409) the node as follows. Process 28 may obtain a current position of the path finding process on 3D mesh 40 and assign the predetermined node in accordance with the current position. For example, if process 28 determines that a node is missing because it was not encountered at an expected position, process 28 determines its current location on the node graph and assigns the missing node to a polygon nearest the current location. This technique is particularly applicable if the change in performance is detected during the path finding process.

If, on the other hand, none of the predetermined nodes has been deleted, process 28 simply re-performs the path finding process on the adjusted node graph, i.e., 3D mesh 40, in order to obtain node path 42.

Once the node path has been determined, process 28 moves (411) a 3D model along the node path.

Figure 7:
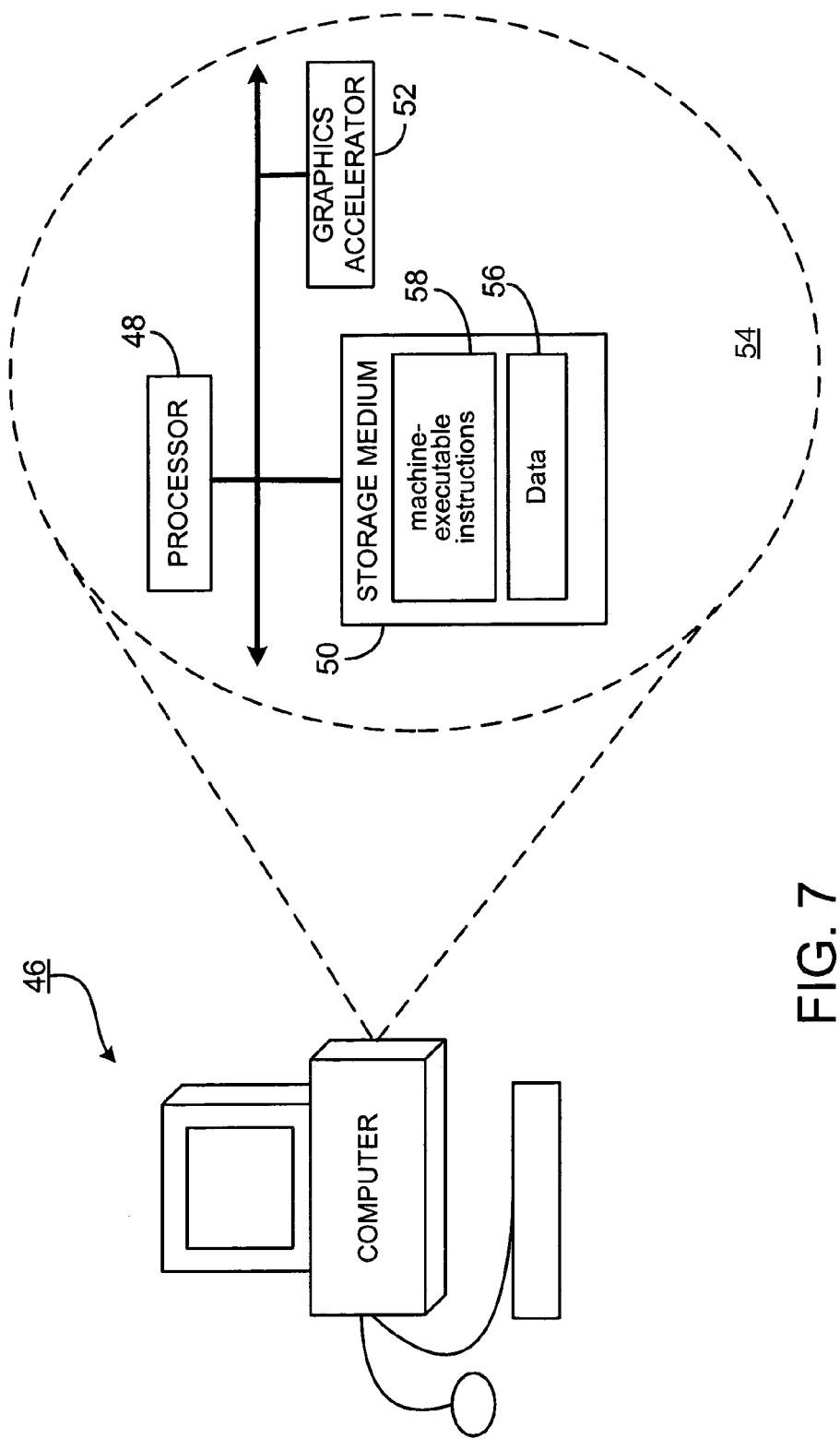
FIG. 7 is a view of a computer system on which the process of FIG. 4 may be implemented.

FIG. 7 shows a computer 46 for determining a node path and for rendering 3D models using process 28. Computer 46 includes a processor 48, a storage medium 50 (e.g., a hard disk), and a 3D graphics accelerator 52 for processing 3D data (see view 54). Storage medium 50 stores 3D data 56 that defines an animation sequence that includes 3D mesh 10, and machine-executable instructions 58 for performing process 28. Processor 48 and/or graphics accelerator 52 execute instructions 58 to perform process 28 on 3D mesh 10.

Process 28, however, is not limited to use with any particular hardware or software configuration; it may find applicability in any computing or processing environment. Process 28 may be implemented in hardware, software, or a combination of the two. Process 28 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 28 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, e.g., a storage medium, such as a CD-ROM, hard disk, or magnetic diskette, that is readable by a general or special purpose programmable computer for configuring and operating the computer when the storage medium or device is read by the computer to perform process 28. Process 28 may also be implemented as a computer-readable storage medium, configured with a computer program, where, upon execution, instructions in the computer program cause the computer to operate in accordance with process 28.

Process 28 is not limited to the embodiments described herein. The blocks of process 28 are not limited to the order shown. Blocks in the run-time stage may also be performed in the pre-processing stage and vice versa. Process 28 can be used with any type of 3D mesh, not just surface terrains. For example, process 28 may be used to determine a node path through a maze in a video game. Metrics other than those described above may be used.

Other embodiments not described herein are also within the scope of the following claims.

What is claimed is:

1. A method of determining a node path through a node graph, comprising:
   determining the performance of a platform running an animation sequence that includes the node graph, the node graph having a plurality of polygons;
   adjusting the node graph depending, at least in part, on the performance to change the number of polygons associated with the node graph, and causing the removal of at least one specified node of a node path of a model traversing the node graph;
   determining whether one or more predetermined types of specified node associated with the node path has been removed;
   re-locating the specified node of a predetermined type back onto the adjusted node graph depending on which type of predetermined type the specified node is, wherein each predetermined type indicates a different characteristic of the node graph and relative to other predetermined types; and
   performing a path finding process using the re-located specific node.

2. The method of claim 1 wherein the determined predetermined types of specified node that triggers re-locating is a blocking node on the node graph that forces redirection of the node path, a start node of the node path on the node graph, or a destination node of the node path on the node graph.

3. The method of claim 1 wherein a 3D mesh defines the node graph, and wherein when the node graph comprises data that is separate from the 3D mesh, nodes of the node graph are superimposed over the 3D mesh and contain data related to vertices of the 3D mesh; and
   wherein when the node graph comprises data associated with the 3D mesh, nodes of the node graph are located at centers of polygons of the 3D mesh or at vertices of the 3D mesh.

4. The method of claim 3, comprising:
   initially modifying the node graph in accordance with a metric;
   performing a path finding process through the modified node graph to determine a node path, and
   wherein the running of the animation sequence and the adjusting is on the modified node graph.

5. The method of claim 4, wherein the metric comprises maintaining a steady frame rate for an animation sequence that includes the node graph.

6. The method of claim 4, comprising:
   detecting a change in performance of the platform by using the modified node graph, and
   wherein the adjusting of the node graph is in accordance with the change in performance of the platform.

7. The method of claim 6, wherein the modified node graph is adjusted to compensate for the change in performance of the platform.

8. The method of claim 1 wherein the node graph comprises a three-dimensional mesh and re-locating comprises:
   obtaining a position on the three-dimensional mesh that corresponds to the specific node; and
   assigning the specific node to a polygon in the three-dimensional mesh that is closest to the position.

9. The method of claim 1, wherein the node graph comprises a three-dimensional mesh and re-locating comprises:
obtaining a current position of the path finding process on the three-dimensional mesh; and
assigning the specified node in accordance with the current position.

10. A method of determining a node path of a 3D model through a node graph, comprising:
performing, using a processor, a path finding process to determine the node path a 3D model in an animation sequence should take through a 3D mesh with polygons and that defines the node graph, and comprising:
providing the node path with a start node corresponding to one of the polygons of the 3D mesh and a destination node corresponding to a different polygon of the 3D mesh, wherein the start node and the destination node comprise nodes of the node graph,
wherein the node graph comprises data that is separate from the 3D mesh, and the method comprising superimposing the node graph over the 3D mesh by using data related to vertices of the 3D mesh and contained by the node graph, and
wherein when the node graph comprises data associated with the 3D mesh, nodes of the node graph are located at centers of polygons of the 3D mesh or at vertices of the 3D mesh;
adjusting the node graph to change the number of polygons associated with the node graph, and causing the removal of at least one specified node of a node path of a model traversing the node graph;
determining whether one or more of the removed specified nodes is a start node or destination node;
re-locating the specified node if the specified node is the start node or destination node; and
performing a path finding process using the re-located specific node.

11. The method of claim 10, comprising:
initially modifying the node graph in accordance with a predetermined platform performance;
wherein performing a path finding process is through the modified node graph.

12. The method of claim 11, comprising:
determining if the platform performance has changed due to the path finding process;
adjusting the modified node graph to compensate for a change in the platform performance; and
re-performing the path finding process through the adjusted modified node graph to obtain the node path.

13. The method of claim 12, wherein platform performance comprises maintaining a steady frame rate for an animation sequence that includes an original, modified or adjusted node graph.

14. The method of claim 12, wherein modifying or adjusting the node graph comprises changing an amount of polygons that make up the three-dimensional mesh.

15. The method of claim 12 wherein the node graph is adjusted to compensate for the change in performance of the platform.

16. The method of claim 12, wherein the adjusting causes removal of at least one specified node of the adjusted modified node graph, the method comprising:
determining whether one or more predetermined types of specified node associated with the node path has been removed wherein the start and destination nodes are predetermined types, and wherein a blocking node of the node graph is a predetermined type;
re-locating the specified node of the predetermined type back onto the node graph; and
performing the path finding process using the re-located specified node.

17. The method of claim 16 wherein the re-locating comprises:
obtaining a position on the three-dimensional mesh that corresponds to the specified node; and
assigning the specified node to a polygon in the three-dimensional mesh that is closest to the position.

18. The method of claim 16, wherein the re-locating comprises:
obtaining a current position of the path finding process on the three-dimensional mesh; and
assigning the specified node in accordance with the current position.

19. The method of claim 10 comprising:
detecting a change in frame rate in the path finding process using the node graph;
adjusting the node graph by changing the number of polygons forming the 3D mesh to attempt to obtain a predetermined frame rate when a change in frame rate is detected; and
re-performing the path finding process through the adjusted node graph to obtain the node path.

20. The method of claim 19 wherein the adjusting removes specified nodes from the node graph, the method comprising:
re-locating the specified node back onto the node graph, wherein the re-performing comprises performing the path finding process using the re-located specified node.

* * * * *